Figures 1, 3:
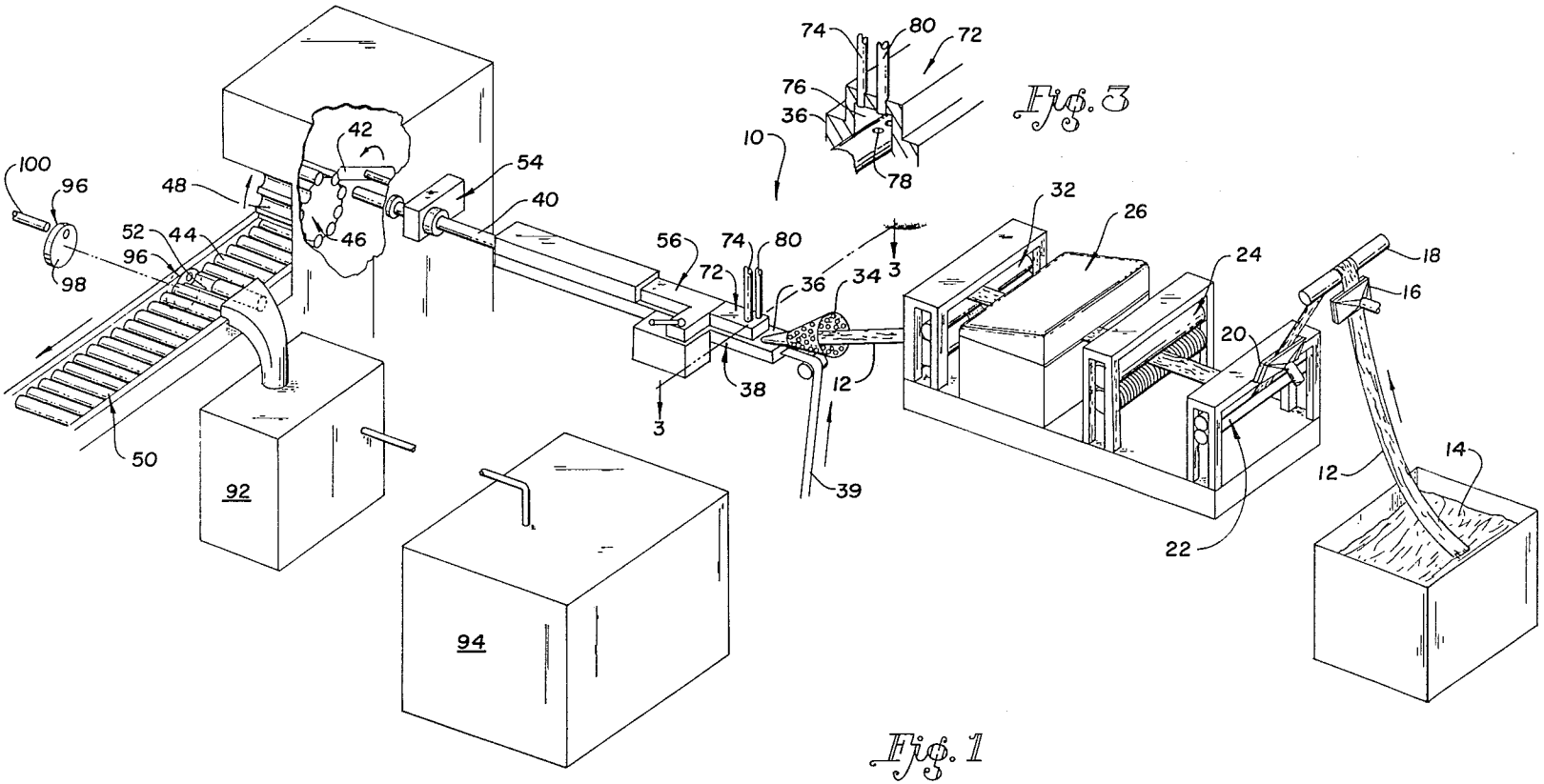
Figure 2:
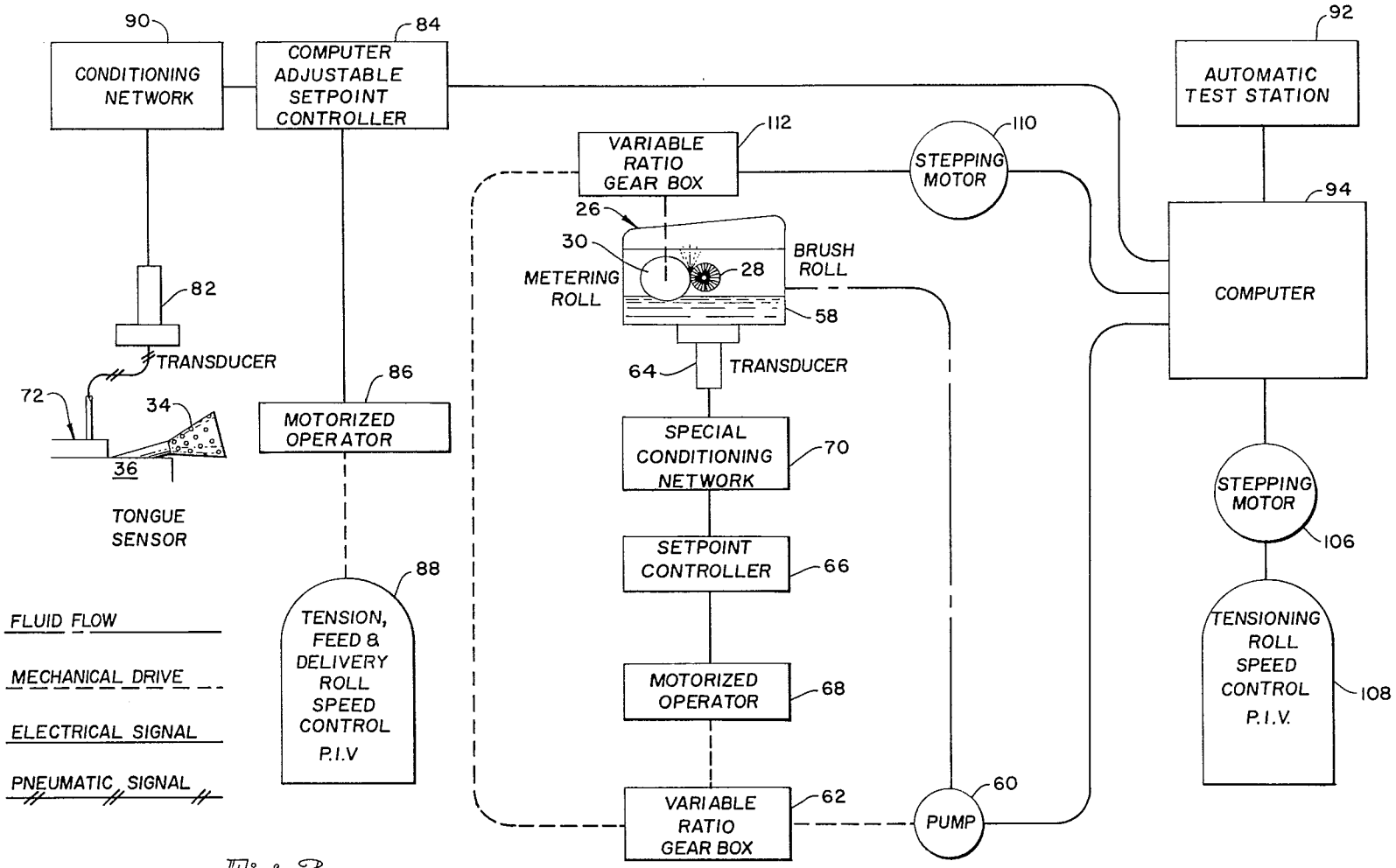

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 7

T941,011

AUTOMATIC CONTROLLED APPARATUS FOR PRODUCING TOBACCO SMOKE FILTER RODS

Kyle E. Morrison, Rte. 15, 936 Chadwick, Apt. 3 37660; Richard E. Bevington, Jr., 2112 Tallwood Lane 37660; and Robert E. Duram, Rte. 9, Mere Vista 37663, all of Kingsport, Tenn.

Filed May 6, 1974, Ser. No. 467,524
Int. Cl. B29d *23/00*
U.S. Cl. 93—1 C
2 Sheets Drawing. 20 Pages Specification

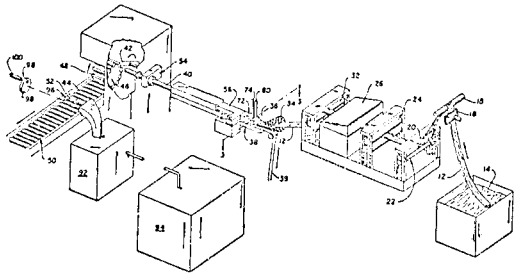

An apparatus for producing tobacco smoke filter rods from a continuous length of banded filter tow and having a set of tension rolls, a set of feed rolls, a plasticizer application device for applying plasticizer to the banded filter tow, a set of delivery rolls, a collecting trumpet for initiating condensing of the banded filter tow toward a rod-like configuration, a folder tongue immediately adjacent the collecting trumpet for further condensing the banded filter tow to the rod-like configuration, a garniture device in which the filter tow is moved and wrapped, a severing device, and conveyors for conveying the severed filter rods away from the apparatus, the improvement comprising an air sensing device connected to the folder tongue for sensing resistance to flow of air through the filter tow passing through the folder tongue and for generating a signal proportional to the density of the tow passing through the folder tongue. The signal generated is compared with a voltage set-point which represents a predetermined pressure drop, hence predetermined density of filter tow, and should the generated signals compared differ from the voltage setpoint, the delivery rolls, feed rolls and tension rolls are either slowed or speeded up relative to the speed of the filter tow moving through the garniture device so as to cause either a greater or less amount of filter tow to be fed into the folder tongue.

AUTOMATIC CONTROLLED APPARATUS FOR PRODUCING TOBACCO SMOKE FILTER RODS

Original Filed May 6, 1974